O. J. BJERKE.
HOT AND COLD FAUCET.
APPLICATION FILED FEB. 5, 1915.
1,187,245.
Patented June 13, 1916.
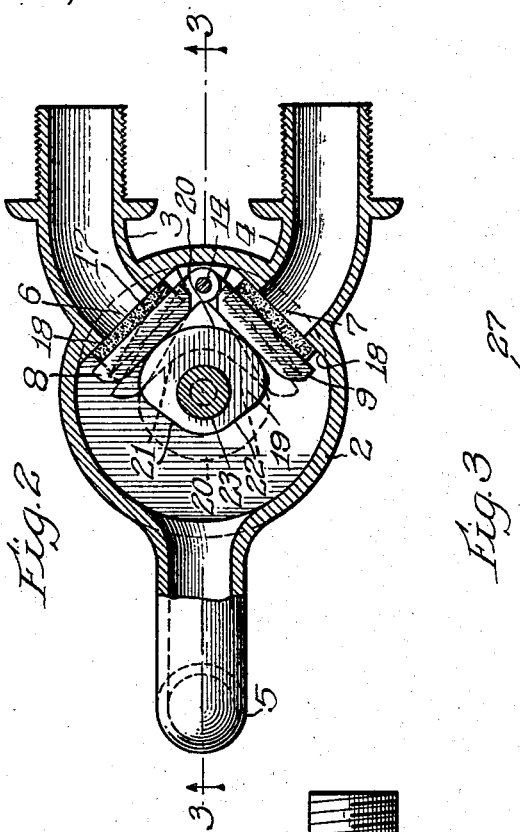
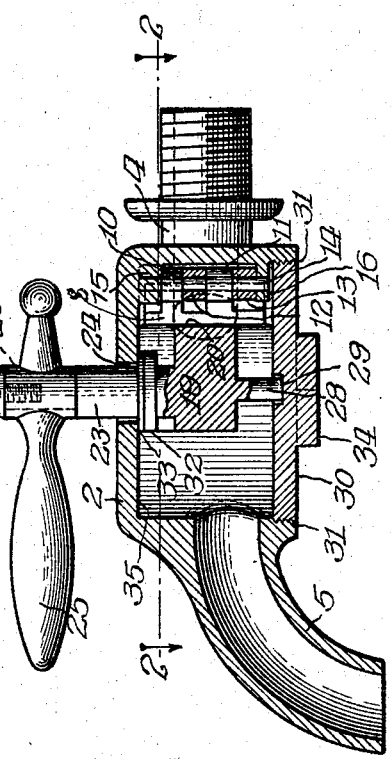
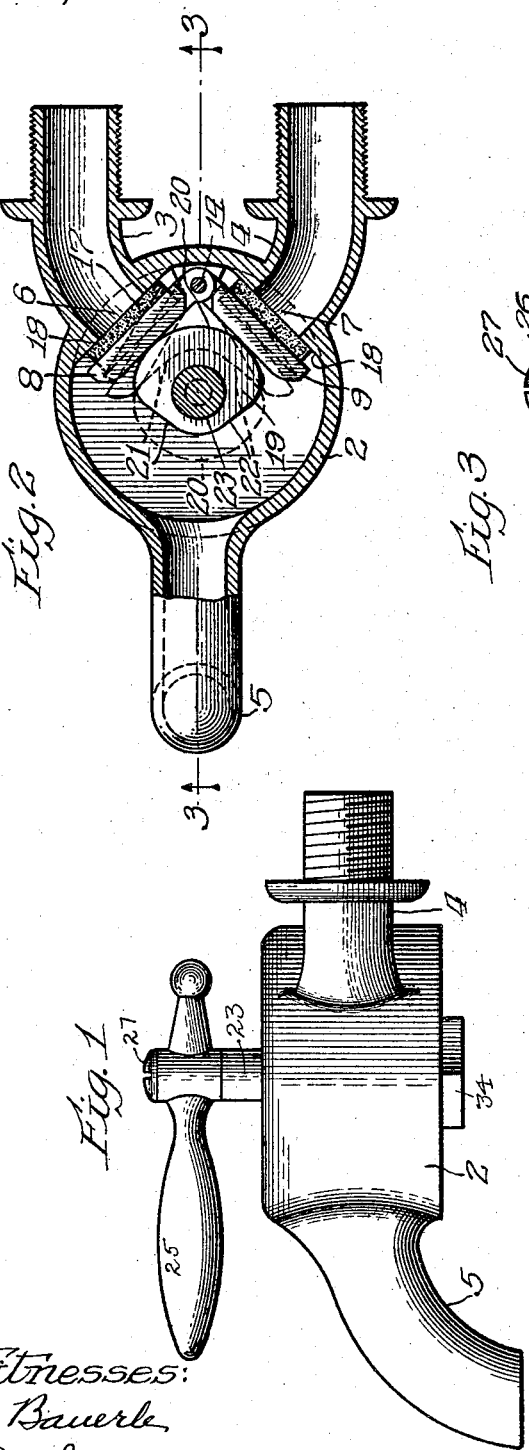
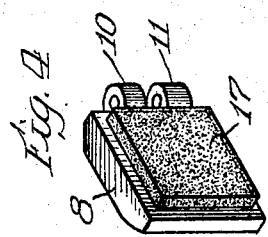
Witnesses:
R. Bauerle
A. J. Sauser
Inventor:
Olaf J. Bjerke
by J. Verner Eckstrom
Atty

UNITED STATES PATENT OFFICE.

OLAF J. BJERKE, OF CHICAGO, ILLINOIS.

HOT AND COLD FAUCET.

1,187,245.   Specification of Letters Patent.   Patented June 13, 1916.

Application filed February 5, 1915. Serial No. 6,199.

*To all whom it may concern:*

Be it known that I, OLAF J. BJERKE, a subject of the King of Norway, residing at Chicago, in the county of Cook and State of Illinois, have invented certain new and useful Improvements in Hot and Cold Faucets, of which the following is a specification.

My invention relates to faucets and has reference to a new and improved faucet adapted to control the flow of liquid from a plurality of channels having a common outlet in said faucet.

The particular object of the invention is to provide simplified means for drawing either hot or cold water or any desired mixture thereof, and to do away with one of the faucets in a hot and cold water installation.

Other objects are to save room, improve the appearance of plumbing, reduce cost of plumbing, to give better control of hot and cold water mixtures, and to attain such other minor advantages as will appear from the detailed description of my improved structure.

With these objects in view the invention consists in the novel construction, combination and arrangement of parts all as hereinafter described in detail, illustrated in the accompanying drawing and incorporated in the appended claim.

In the drawing—Figure 1 is an outside view in elevation of a stop cock or faucet embodying my invention. Fig. 2 is a section on line 2—2 of Fig. 3. Fig. 3 is a section on line 3—3 of Fig. 2. Fig. 4 is a perspective view of one of the pivoted valves, or closers.

In the several views 2 represents the faucet body from which extends a pair of threaded inlet branches 3 and 4 to be suitably connected with hot and cold water pipes, respectively, and 5 is the nozzle or outlet common to the branches 3 and 4. 6 and 7 are the interior outlets for the branches 3 and 4 and these outlets are normally closed by a pair of pivoted doors or flap valves 8 and 9 that are provided with perforated ears 10 and 11 on one of the valves overlapping similar ears 12 and 13 on the other valve. These ears are pivotally mounted on a pin or pivot 14 the ends of which engage apertured lugs 15 and 16 on the interior of the body 2 and between the openings 6 and 7. The opening and closing of the doors or valves 8 and 9, each of which is provided with a fiber packing portion or surface 17 to engage a seat 18 around each opening 6 and 7, is controlled by a cam 19 having a semicircular surface 20 and straight tangential surfaces 21 and 22, the surface 20 bearing against the doors when closed as in Fig. 2 while the rotation of the surfaces 21 and 22 opposite the respective valves or doors permits them to open as indicated by dotted lines in said Fig. 2. From the upper side of the cam extends a stem 23 for which a bore 24 is provided in the body 2. On the upper end of this stem is secured in the usual way the usual handle 25 provided for that purpose with a hole engaged by a reduced portion 26 of the stem 24, said reduced portion having a threaded hole with which the usual screw 27 has threaded engagement and holds the handle on the stem 23. On the lower side of the cam 19 and co-axial with the stem 23 is a pivot stud 28 the end of which engages a recess 29 of a cap or closer 30 having threaded engagement at 31 with the interior walls of the hollow body 2. Within said hollow body and on the stem 23 is a flange or collar 32 which bears against a fiber washer 33 or other suitable packing interposed between said flange or collar and the upper wall of the body 2 around the opening 24. The part 33 may also represent a ground portion engaging a suitably ground surface on said upper wall. Said part 33 is forced against the interior wall of the body 2 by means of the closer 30 which is provided with a suitable portion 34 to be engaged by a wrench. By turning the closer 30 on its threads wear between the part 33 and the interior portion of the upper wall, designated as 35, may be taken up from time to time.

As will be noticed by reference to Fig. 3 the mechanism is easily accessible by removing the cap, plug or closer 30, and the simplicity of the construction results in the avoidance of repairs and disarrangements. The parts 23, 32, 19 and 28 are preferably parts of a single member which is of a form suitable to be cast. The wear on the packing 17 is inconsequential as the frictional wear and tear to which "Fuller balls" are subject is absent because the packing is simply pressed against its seat and has no sliding movement.

While the improved construction herein shown makes it possible, as shown, to omit the usual stuffing box, the cam 19 may just as well be mounted on the ordinary stem of the Fuller cock, and numerous modifications or variations in the form of the construction may be made without departing from the spirit of the invention.

In operation both valves or closers 8 and 9 are simultaneously controlled to keep either one of the closers entirely closed while the other is opened to the desired extent, or both closers may be partly opened but to a different extent by rotating the point of junction of surfaces 21 and 22 to one side or the other of the pivot 14, as will plainly appear by reference to Fig. 2. In said figure when, for instance, the surface 21 is rotated toward the right to face the closer 8 and the upper end of the arc 20 passes the middle of the door moving toward the pivot 14 said end will recede from the normal plain of the door and permit it to gradually open while the door or closer 9 is held closed until said upper end of the arc of the semicircular surface 20 passes the middle of the door 9 when it, too, will begin to open. At this point of rotation of the cam the door 8 will be wide open and the door 9 partly opened. Reversing the above named movement the door 9 will first be opened in like manner and then the door 8. Thus hot and cold water may be mixed in any desired relative proportions.

Having thus described my invention I claim as new and desire to secure by Letters Patent.

In a faucet the combination with a hollow body having two inlets to its interior arranged substantially at right angles to each other, of a pair of flap valves 8 and 9 pivoted on the same axis and movable to open or close either or both of said inlets, and a cam rotatable between said flap valves to close same or permit same to open under water pressure.

In testimony whereof I have hereunto set my hand in the presence of three subscribing witnesses.

OLAF J. BJERKE.

Witnesses:
ANTON F. HANSEN,
CHRIS. HANSEN,
HENRY A. ARNESEN.

Copies of this patent may be obtained for five cents each, by addressing the "Commissioner of Patents, Washington, D. C."